(12) United States Patent
Bourland et al.

(10) Patent No.: US 12,735,174 B2
(45) Date of Patent: Sep. 15, 2026

(54) MECHANICAL FLIGHT CONTROL ACTUATOR FOR AN AIRCRAFT

(71) Applicant: THALES, Meudon (FR)

(72) Inventors: Jean-Claude Bourland, Chatellerault (FR); Gilles Thouvenot, Valence (FR); Hervé Lorin, Poitiers (FR); Julien Courtial, Livron-sur-Drome (FR)

(73) Assignee: THALES, Meudon (FR)

( * ) Notice: Subject to any disclaimer, the term of this patent is extended or adjusted under 35 U.S.C. 154(b) by 0 days.

(21) Appl. No.: 19/135,349

(22) PCT Filed: Dec. 12, 2023

(86) PCT No.: PCT/EP2023/085444
§ 371 (c)(1),
(2) Date: Jun. 3, 2025

(87) PCT Pub. No.: WO2024/126527
PCT Pub. Date: Jun. 20, 2024

(65) Prior Publication Data

US 2026/0200572 A1 Jul. 16, 2026

(30) Foreign Application Priority Data

Dec. 14, 2022 (FR) ...................................... 2213362

(51) Int. Cl.
*B64C 13/50* (2006.01)
*B64C 13/28* (2006.01)

(52) U.S. Cl.
CPC .......... *B64C 13/505* (2018.01); *B64C 13/341* (2018.01)

(58) Field of Classification Search
CPC ............................ B64C 13/505; B64C 13/341
See application file for complete search history.

(56) References Cited

U.S. PATENT DOCUMENTS

| | | | |
|---|---|---|---|
| 5,184,054 A | 2/1993 | Delattre et al. | |
| 6,325,331 B1 | 12/2001 | McKeown | |
| 2015/0107957 A1* | 4/2015 | Kruk | B64C 13/505 192/84.6 |
| 2018/0197385 A1 | 7/2018 | Jayaraman et al. | |

FOREIGN PATENT DOCUMENTS

| | | | |
|---|---|---|---|
| CN | 108566036 A * | 9/2018 | H02K 7/06 |
| CN | 114228979 A * | 3/2022 | B64C 13/505 |
| GB | 2 306 610 A | 5/1997 | |
| WO | WO-2024126527 A1 * | 6/2024 | B64C 13/505 |
| WO | WO-2025008590 A1 * | 1/2025 | B64C 13/505 |

* cited by examiner

*Primary Examiner* — Valentina Xavier
(74) *Attorney, Agent, or Firm* — BakerHostetler

(57) ABSTRACT

A mechanical flight control actuator, intended to provide assistance for piloting an aircraft, includes a first electric motor, a second electric motor and a backup assist shaft. The backup assist shaft is adapted to be set into rotation by the second electric motor. The backup assist shaft includes a backup assist clutch device, the backup assist clutch device being capable of assuming an active position, wherein the backup assist shaft drives the output shaft, and an inactive position, and the backup assist clutch device is in its active position when the input clutch device is in its inactive position and the backup assist clutch device is in its inactive position when the input clutch device is in its active position.

10 Claims, 4 Drawing Sheets

MECHANICAL FLIGHT CONTROL ACTUATOR FOR AN AIRCRAFT

CROSS-REFERENCE TO RELATED APPLICATIONS

This application is a National Stage of International patent application PCT/EP2023/085444, filed on Dec. 12, 2023, which claims priority to foreign French patent application No. FR 2213362, filed on Dec. 14, 2022, the disclosures of which are incorporated by reference in their entireties.

FIELD OF THE INVENTION

The present invention relates to a mechanical flight control actuator intended to provide assistance to means for piloting an aircraft. The technical field is therefore that of mechanical flight controls in aeronautics and actuators feeding back force on a stick or a pedal, in particular, for a helicopter. More specifically, the invention falls within the context of a control actuator compatible with two high-integrity "Fail-Safe" and high-integrity "Fail-Operational" versions or architectures with a view to higher availability.

BACKGROUND

In an AFCS ("Automatic Flight Control System") system, a helicopter is piloted by virtue of equipment controlling and moving the linkage ("Flight Path") engaged with the control surfaces or the flight surfaces, according to the profile of helicopters via power amplification, for example by means of hydraulic valves. Piloting can be fully automatic using guidance algorithms, on the one hand, and stabilization algorithms for the flight qualities, on the other hand, or semi-automatic involving joint manual action on the stick/pedals or can be disengaged and involve manual piloting.

In a helicopter, the avionics control the four Roll/Pitch/Yaw piloting and collective pitch axes. A conventional AFCS architecture comprises, in order to actuate the movement stroke for the linkage for low-authority and high-velocity linear series, actuators intended for flight stabilization, and high-authority, low-velocity parallel rotating trim actuators, which, in addition, feed back force during manual piloting.

In a limited architecture, trim actuators with higher speed and bandwidth allow stability functions to be contemplated for backup or for degraded flight control performance capabilities.

In the previous generation of electromechanical trimming, for manual piloting, under the activated force law, the actuators required passive friction, which was implemented by mechanical devices in the helicopter linkage (pad on the linkage, for example, on the collective axis).

The friction of the helicopter comprises a part that is inherent to the linkage (fairly limited according to the helicopter, ranging between 0.5 and 3 Nm or even 5 Nm on some axes and types of helicopters), and adjusting the trimming involves pre-charging the order of the linkage friction for pilot comfort during manual piloting and slightly beyond, with a margin for safeguarding against untimely disengagement of the autopilot. Depending on the type of helicopter and on the axes, there also may be a requirement for a localized friction device, typically up to the order of 6 Nm.

In this configuration, passive backup friction in the linkage becomes a limitation due to its variability (subject to the load factor, wear), and becomes a disadvantage for controlling a predetermined force law during nominal operation. Furthermore, for a motorized force law, maximum reversibility is sought in order for the shaft to feel free and in order to precisely and faithfully (non-linearities) feed back an adaptable force law during flight throughout the flight envelope.

The pads in the linkage are still devices that are subject to wear, which are constantly used, and are therefore difficult to manage with respect to the AFCS avionics suite. This results in periodic checks and re-calibrations.

Such actuators are notably disclosed in document U.S. Pat. No. 5,184,054 and in document U.S. Pat. No. 6,325,331.

Document US20180197385 mentions, for its part, the use of a trim actuator allowing passive friction inserted into a module on the output shaft or located in the linkage. However, this solution results in significant volume: typically a brake/clutch assuming forces of 20 Nm requires a volume with an 80 mm diameter×45 mm length; that is, 16% of the compact volume of the intended actuator and with a mass of 700 g; that is, 35% of the overall intended mass of 2 kg of the actuator.

Furthermore, the mechanical friction power on the actuator output would be significant for dimensioning the friction and for disengaging this function, which must convey the forces/kinematics of the actuator.

The "Fail-Operational" version of the prior art relies on redundancy by means of a second active channel including a motorization and full transmission to the output shaft.

The architecture can include a third bulky clutch on the output shaft. An alternative is to use a planetary gear on the output shaft to couple the two transmission chains, but with significant play. Finally, a mechanical fuse can be integrated on the output shaft as a final protection. Another alternative is to use a "Harmonic Drive" transmission principle with limited play, but which involves significant volume and mass, as well as having the disadvantage of variability in the temperature of the reduction ratio and the efficiency.

Therefore, a requirement exists to propose a mechanical control actuator for an actuator allowing a high integrity solution to be provided with two versions, while being highly compact, for example:

- an optimized passive backup function in a "Fail-Safe" (friction, viscous damping) version;
- an active backup function in a "Fail-Operational" version for high availability, ensuring, in the event of a failure or an error, clear automatic switching to a second active motorization channel that delivers all the control functions for the actuator.

"Fail-Safe" version is understood to mean a passive friction and viscous damping function.

"Fail-Operational" version is understood to mean an active actuation function by virtue of a particular redundancy compromise in terms of the electronic and electromechanical elements that are the most demanding in the reliability budget.

SUMMARY OF THE INVENTION

The present invention aims to at least partly address this requirement.

More specifically, the aim of the present invention is to propose a high integrity mechanical control actuator capable of delivering force feedback to the pilot by integrated control of its motorization.

To this end, a first aim of the invention relates to a mechanical flight control actuator intended to provide assistance to means for piloting an aircraft, said flight actuator comprising:

a first electric motor;

an input shaft adapted to be set into rotation by the first electric motor, said input shaft comprising an input clutch device, said input clutch device having an active position, in which it is capable of coupling the input shaft with an output shaft via an intermediate shaft, and an inactive position;

the output shaft being capable of being connected to the means for piloting the aircraft, said output shaft being adapted to be coupled with the input shaft when the input clutch device is in the active position;

The actuator comprises:

a second electric motor;

a backup assist shaft, said backup assist shaft being adapted to be set into rotation by the second electric motor, said backup assist shaft comprising a backup assist clutch device, said backup assist clutch device being capable of assuming an active position, in which the backup assist shaft drives the output shaft, and an inactive position, and in that the backup assist clutch device is in its active position when the input clutch device is in its inactive position and said backup assist clutch device is in its inactive position when the input clutch device is in its active position.

The invention is suitable for use in a "Fail-Safe" version and then in a "Fail-Operational" version.

In the "Fail-Safe" version, the invention involves a new $M=C\cdot\dot{\theta}$ type adjustable friction backup and viscous damping function (passive devices) with the particular feature of a device selectively applied by virtue of an input clutch and a backup assist shaft adapted to act on the output shaft when the input clutch device is in an inactive position. Such an actuator allows high compactness to be provided because this device is designed in an upstream part of the transmission of the equipment with a limited maximum torque on the shaft on which the unit can be activated. In nominal operation, the active force feedback is provided by torque control of the motor and by estimating the resistive torque on the output shaft, which allows dynamic tactile feedback to be fed back with torque and damping. The intermediate shaft is capable of implementing or supporting a gear train for coupling the input shaft with the output shaft. In a full mechanical configuration, the backup assist shaft is capable of braking and damping rotational movements of the output shaft. In a limited configuration for assembly, the backup assist shaft is capable of braking or damping rotational movements of the output shaft. When the backup assist shaft is not able to set into rotation the output shaft, the backup assist is passive and it is not able to set into rotation the output shaft. The motorization is then lost. The rotation of the output shaft is no longer induced only by the pilot and the aerodynamic reactions (rotations outside the actuator). The notion of assistance is provided by the main function, in nominal operation, for example, when a monitoring unit does not detect any erroneous detection. This allows the clutch input device to remain in the clutched state.

In a particular embodiment, a failure of the electric motor renders the input clutch device inactive and renders the backup clutch device active. This is allowed by means of a monitoring unit adapted to detect failures. Thus, a failure of the electric motor is detected by the monitoring unit, which automatically controls the dual-clutch clutch device, by rendering the input clutch device inactive and rendering the backup clutch device active. The invention involves, in a "Fail-Operational" version, an identical mechanical switching device in the event of a failure detected by the monitoring unit on a second active motorization channel and partial upstream transmission. In a particular embodiment (estimated less than 10-10/FH) the two motorization channels are "cold redundancy" channels, for example exclusively activated.

In the event of erroneous detection, the mechanical actuator switches the load of the output shaft to a "fail-safe" configuration between the motorized shaft and the shaft of the passive friction/damping device in a few tens of milliseconds. Switching a load (backup assist shaft) is preferable in terms of feel by virtue of the damping of the transient torque, in the "Fail-Safe" version via a passive mechanism and in the "Fail-Operational" version via a second active chain. In addition, the damping on the backup assist shaft favorably acts on the motor input shaft that transiently would have an established or residual velocity after passivation by the monitoring unit, for example, during a 28 V cutoff by a "circuit breaker" on the power point.

In a particular embodiment, the input clutch device and the backup assist clutch device are jointly electrically controlled by the same signal. This electrical control is common for the "safety" aspects and with the particular feature of automatic shaft switching devices with a particular supplementary dual-clutch device with three shafts. This provides very high integrity with dual electronic and physical monitoring of rotation of the backup assistance shaft. In addition, the clutch devices can be electrically controlled by a discrete, secure Force Drive Release (FDR).

In a particular embodiment, the first electric motor is identical to the second electric motor.

The two motorizations (in terms of the power-breaker) are exclusively activated for cold redundancy.

In a particular embodiment, the input clutch device is of the "current draw" type with logic complementary to the backup assist clutch device of the "current shortage" type.

The clutch assist device can use the same mechanical friction, or claw, or other mechanical particle or fluid technologies.

In a particular embodiment, the transition between the input clutch device and the backup assist clutch device is automatic.

Thus, the pilot does not need to trigger the mechanical fuse at the output of the actuator in the event of a blockage in the upstream stage of the actuator (failure channel 1). It is thus possible to obtain a mechanical switching channel providing very high safety with integrity of 10-10/FH (2×10-11/FH estimation with an extension to a dual COM/MOM Std-By) and high availability of 10-7/FH (10-8/FH estimation with an extension to a dual COM/MOM Std-By) in the "Fail-Operational" version, by virtue of the reliability of the output stages and of the (non-redundant) guidance elements and by virtue of physical decoupling of the potentially faulty channel 1 from the motorization channel 2 (Std-By). This mechanical switching yields a "fault-tolerant" architecture compared to other integrated "dual-motor" architectures where the failure modes induced between motors can be more complex to passivate. Furthermore, switching of the mechanical channel can be carried out in terms of ergonomics/feel with a transition of less than 30 ms, and an engine control filtering sequence resulting in a minimum loop reset time of the order of 100 ms, with a transition of control that is potentially filtered over 500 ms.

In a particular embodiment, the transition between the input clutch device and the assist clutch device is managed by transition filtering.

In a particular embodiment, the transition filtering allows simple moving average filtering over a predetermined time window.

In a particular embodiment, the transition filtering is simple exponential smoothing filtering provided by the expression:

$$\hat{x}_{t+1} = \beta \cdot x_t + (1 - \beta) \cdot \hat{x}_t \text{ with } 0 < \beta < 1,$$

with $x_t$ being a value for the time t, $\hat{x}_t$ being a smoothed value for the time t, a smoothed value for the time t+1 and β being a smoothing factor ranging between 0 and 1.

In a particular embodiment, a polynomial regression is added to the simple exponential smoothing filtering.

A further aim of the invention relates to an automatic flight control system for an aircraft comprising a mechanical flight control actuator according to the invention.

BRIEF DESCRIPTION OF THE DRAWINGS

The present invention will be better understood upon reading the detailed description of embodiments that are provided by way of non-limiting examples and are illustrated by the appended drawings, in which.

DETAILED DESCRIPTION

The invention is not limited to the described embodiments and variants and other embodiments and variants will become clearly apparent to a person skilled in the art.

Figure 1:
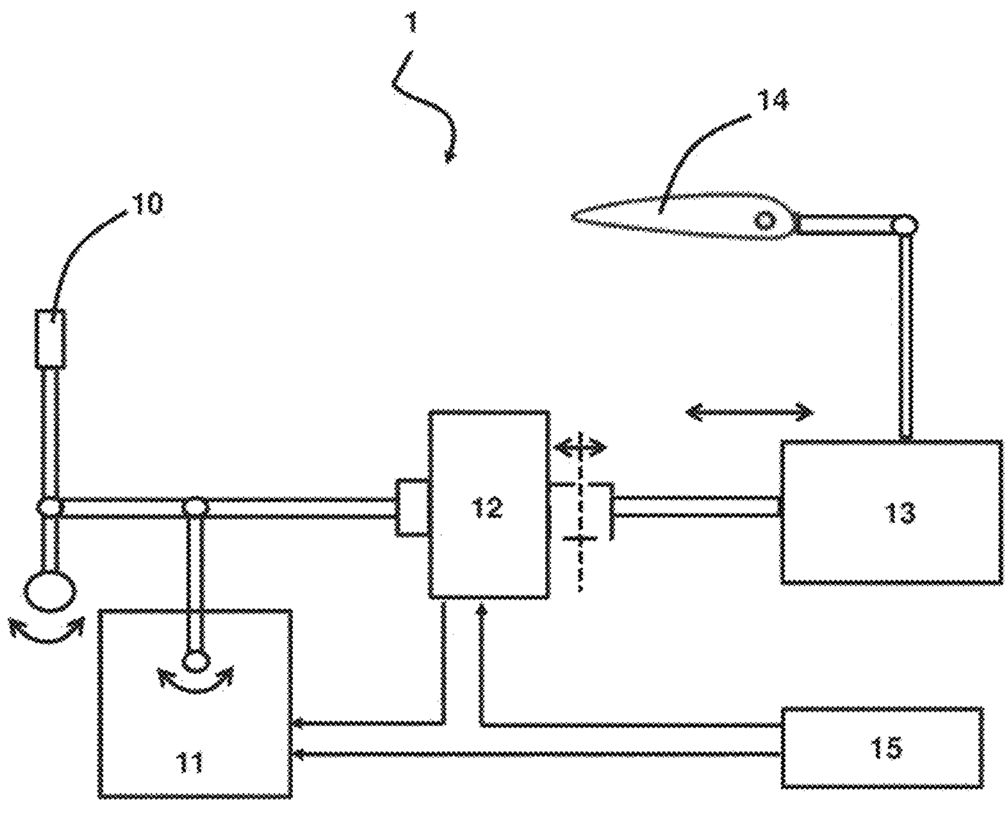
FIG. 1 illustrates an automatic flight control system for an aircraft comprising a mechanical flight control actuator according to the invention engaged on the linkage.

FIG. 1 illustrates an automatic flight control system 1 for an aircraft.

The automatic flight control system 1 comprises:

- a control stick 10;
- a mechanical flight control actuator 11;
- a linear actuator 12;
- a hydraulic actuator 13;
- a controllable flight surface 14;
- an on-board computer 15 or "Flight Control Computer" (FCC).

The control stick 10 is used to be hand-held by the pilot. This stick 10 is used to control the entire linkage of the aircraft.

The mechanical flight control actuator 11 is adapted to provide force feedback to the control stick 10. This mechanical flight control actuator 11 in this case is a parallel rotary actuator. It thus allows a force law to be precisely fed back in the flight envelope that can be adapted in flight. This force law depends on the angular displacement of the control stick 10. It is a digital force law that can be adapted in flight. In this force feedback mode to the pilot, this actuator allows the pilot to be assisted for their control operations. In a second "autotrim" mode, the mechanical flight control actuator 11 is adapted to receive movement commands originating from the linear actuator 12 and the on-board computer 15.

The linear actuator 12 is coupled into the linkage in series engaged with the actuator or the hydraulic amplifier 13 that urges the controllable flight surface 14. The linear actuator thereby creates a linear motion over a stroke of the order of one mm to a few hundred mm. The linear actuator 12 receives position commands and it feeds back the current position to the on-board computer 15, which can be responsible for the PA algorithms. In a variant, the PA algorithms are implemented in the processor of the linear actuator 12. Thus, the linear actuator is adapted to convert a command from the pilot into a particular command intended for the hydraulic actuator 13. More specifically, the linear actuator 12 is adapted to create a straight-line movement. It receives data from the on-board computer 15.

The hydraulic actuator 13 is adapted to receive information from the linear actuator 12 for the purpose of controlling the controllable flight surface 14. For the context of the mechanical flight commands (as opposed to the electric flight commands) the hydraulic actuator 13 amplifies the force/movement on the stroke of the linear actuator 12 for the purpose of controlling or moving the controllable flight surface 14. The hydraulic actuator 13 is a hydraulic cylinder, for example.

The controllable flight surface 14 is moved in order to control the flight of the aircraft. Controlling this controllable flight surface 14 helps to stabilize the aircraft (four control axes on a helicopter). The controllable flight surface 14 is thus adapted to influence the movement of the aircraft. It allows an interaction to be provided between the outside air and the aircraft. This controllable flight surface 14 in this case is controlled about an axis of rotation X.

The on-board computer 15 is adapted to control the flight of the aircraft (Automatic Pilot function). To this end, it acts on the control of the parallel rotary actuator (mechanical flight control actuator 11) and on the linear actuator 12.

Figure 2:
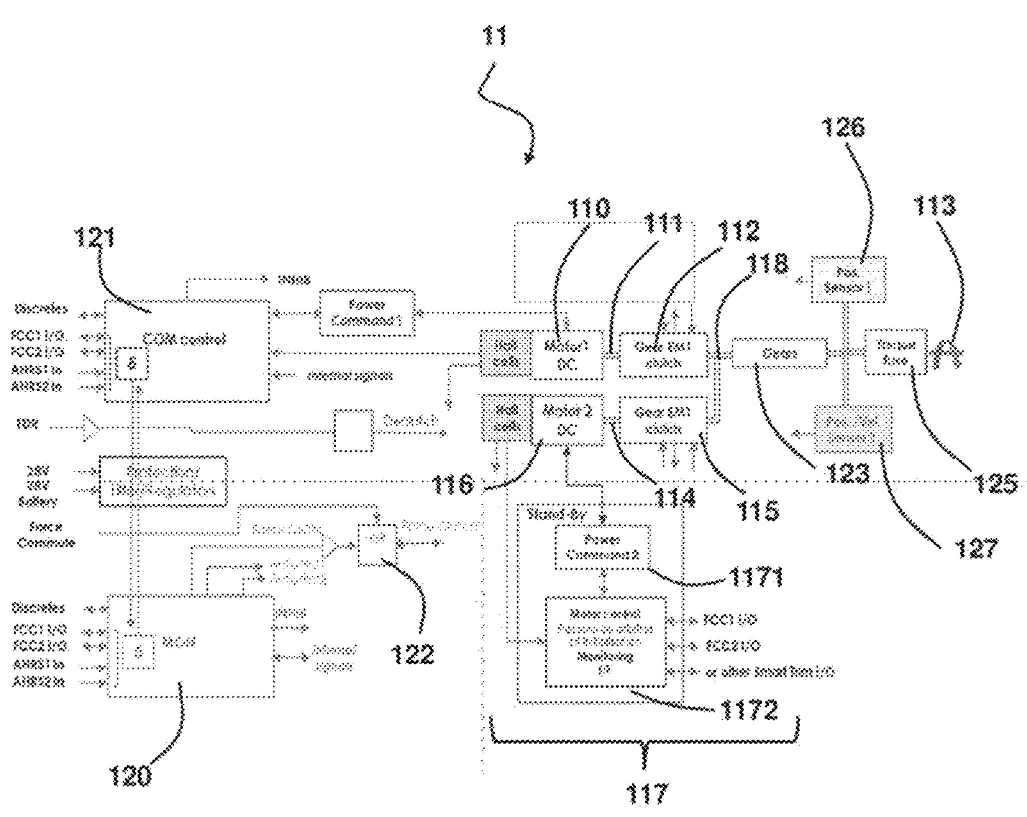
FIG. 2 schematically illustrates the mechanical flight control actuator of FIG. 1, in the case of a "Fail-Operational" version.

FIG. 2 schematically illustrates the mechanical flight control actuator 11 of FIG. 1 according to one production version. This version, called "Fail-Operational" version, is dedicated to the "Simplified Vehicle Operations" applications on the new generations of automated and autonomous in-flight platforms.

This mechanical flight control actuator 11 comprises:

- a first electric motor 110;
- an input shaft 111;
- an input clutch device 112;
- an output shaft 113;
- a backup assist shaft 114;
- a backup assist clutch device 115;
- a second electric motor 116;
- a stand-by unit 117;
- an intermediate shaft 118;
- a monitoring device 120;
- a control device 121;
- a logic operation device 122;
- a gear 123;
- a protection device 125;
- a first detector 126;
- a second detector 127.

The first electric motor 110 is adapted to set the input shaft 111 into rotation.

The second electric motor 116 is adapted to set the backup shaft 114 into rotation.

The first electric motor 110 and the second electric motor 116 in this case are brushless DC motors that are highly reliable and that provide an optimized compromise in terms of electromagnetic density and "cogging" torque and inertia features. Preferably, the first electric motor 110 is identical to the second electric motor 116. These two identical independent motors are activated exclusively in cold redundancy.

The input shaft 111 is adapted to be set into rotation by the motor 110 by means of the gear 123. This input shaft 111 comprises the input clutch device 112, which also can be referred to as clutch EM1. This clutch device 112 can assume an active position, in which it couples the input shaft 111 with the output shaft 113 via the intermediate shaft 118, which supports a gear train. The input clutch device 112 can assume an inactive position, in which it does not couple the input shaft 111 with the output shaft 113. The input clutch device 112 is a friction/slip device.

The output shaft 113 is adapted to be coupled with the input shaft 111 when the input clutch device 112 is active via the intermediate shaft 118, which supports a gear train. The backup assist shaft 114 is adapted to be set into rotation by the second electric motor 116. To this end, the backup assist shaft 114 comprises the backup assist clutch device 115.

This backup assist clutch device 115 is adapted to assume an active position, in which the backup assist shaft 114 drives the output shaft 113, and an inactive position. The backup assist clutch device 115 is in its active position when the input clutch device 112 is in its inactive position. The backup assist clutch device 115 is in its inactive position when the input clutch device 112 is in its active position.

The input clutch device 112 and the backup assist clutch device 115 therefore have complementary logic.

The backup assist clutch device 115 is a friction/slip device. As a variant, this backup assist clutch device 115 uses claw technology. Preferably, the input clutch device 112 uses equivalent technology to the assist clutch device 115 but has complementary control logic.

A failure in the electric motor renders the input clutch device 112 inactive and renders the backup assist clutch device 115 active. It also should be noted that the input clutch device 112 and the backup assist clutch device 115 are electrically controlled via the use of coils. The input clutch device 112 is a current draw clutch device, which requires, for example, the application of a 28 V voltage in the coil of said device for rendering it active. The backup assist clutch device 115 is a current shortage device. This device is therefore active in the absence of a power supply in the coil of said device.

The mechanical flight control actuator (parallel rotary actuator) 11 also comprises the intermediate shaft 118. This intermediate shaft 118 is disposed between the input shaft 111, the backup assist shaft 114 and the output shaft 113. This intermediate shaft 118 is adapted to mechanically connect the input shaft 111 with the output shaft 113 or to mechanically connect the backup assist shaft 114 with the output shaft 113. This intermediate shaft is adapted to support a gear train, which allows a reduction ratio to be provided.

The mechanical flight control actuator 11 comprises the monitoring device 120. The monitoring device 120 monitors the control chain of the transmission and the control of two complementary clutch devices by forcing the declutching of the input clutch device and the clutching of the backup in the event of an erroneous detection on the motor and transmission chain. In the event of an erroneous detection by the monitoring device 120, the compact system switches the load of the output shaft in a few tens of milliseconds to a "fail-safe" configuration between the motorized shaft and the shaft of the passive friction/damping device. This monitoring device 120 is adapted to transmit a control signal to the complementary clutch devices. This monitoring device 120 includes an electronic unit "HW elec" for acquiring the motor signals and a unit "SW" for monitoring application functions for high-level control and for monitoring the equivalent function of the motor control performed by the control unit.

A more complete version for safety integrity involves integrating complete dual COM/MON with COM Std-By and MON Std-By to enhance integrity.

The control device 121 is adapted to control voltages/current in the coils belonging to the input clutch device 112 and the backup assist clutch device 115. More specifically, this control device 121 monitors the actuator modes and the high-level control of the actuator, as well as the High Frequency motor control (servo loop).

The mechanical flight control actuator 11 also comprises a stand-by unit 117. This stand-by unit 117 is segregated. It comprises:

a motor control module 1171;

a power control module of the second electric motor 116.

The motor control module 1171 comprises a load law that is programmed by default or can be selected by an external computer. The control electronics of the second motor are automatically switched in the event of an error detected by MON or in the event of loss, controlled by the computers FCC1/FCC2 or as a backup by a third FCC back-up or by another Smart Trim computer.

The stand-by unit is developed with dissimilar components with respect to the monitoring device 120 and, in a particular embodiment, with respect to the control device 121, notably for monitoring, digital control or controlling the power of the motor.

The logic operation device 122 for its part allows a logic operation of the OR type to be carried out. This device 122 is thus adapted to receive an FC ("Force Commute") signal, and signals originating from the monitoring device 120 and potentially from the control device 121. This device 122 is adapted to deliver signals to the input clutch device 112 and the backup assist clutch device 115.

The protection device 125 comprises a torque limiter or mechanical fuse on the output shaft 113. This device 125 protects the mechanical chain up to the output of the output shaft 113 in the event of a highly unlikely failure linked to the electromechanical components and the bearing of the transmission leading to a blockage in said output shaft 113. In a particular embodiment, this mechanism can provide several mechanical fuse functions, triggering predetermined static friction and/or viscous damping.

A monitoring device comprises a first detector 126, a second detector 127. These detectors notably allow the rotation of the output shaft 113 to be monitored. These detectors are, for example, Hall effect detectors facing a magnet mounted on a nearby disk. It is based on the principle of assembling a reducer or any other bellows-type coupling means in the axis of the output shaft 113, for coupling a position/speed sensor.

It also should be noted that the system is designed for maximum "safety" allowing high integrity of the Catastrophic class (regulation according to CS-29, CS-25 at the probability of 10-9/FH) or better (estimated at 10-10/FH and with full dual COM/MOM Std-By estimated at 2×10-11/FH) in the event of erroneous detection of the force law below the expected level or that is excessive with passivation being impossible. Indeed, the common control circuit by the monitoring unit (independent and segregated unit) controls the coils of the two clutches. The method is also monitored by acquiring the current/voltage signal of each of the coils. In particular, beyond this monitoring, the invention allows a potential clutch fault of the passive unit to be detected, which would lead to overloading on the motorized chain linked to this erroneously clutched friction. The detection is performed by means of a reliable velocity measurement by the monitoring unit via detection by means of a Hall-effect cell facing a magnet on a disk, or via an incremental inductive type encoder. Beyond current/voltage monitoring of the control stage of the two clutches, the invention thus integrates particular monitoring of rotation to ensure that the friction/damping unit is not abnormally clutched with rotation of its axis in relation to the rotation of the motor-side upstream shaft. The monitoring device 120 monitors the switching logic of the dual clutch and detects the consistency of the state of the two clutches by means of two different measurement circuits.

Finally, it should be noted that the electronics in this case are adapted to allow self-testing to be carried out of the motorization channel in a "Fail-Safe" version using the friction backup channel to load the motorization of the main channel. In predictive maintenance, this allows the upstream/motorization transmission to be calibrated on the predefined load and a loaded motor equivalent model and possible aging to be identified. Similarly, the particular principle in a "Fail-Operational" version involves testing, for each self-test, the two motorization chains, testing the complementary dual clutch, and the Std-By function, by verifying the consistency of the velocities measured on the two motors (measured by a Hall cell) by comparing it with the position of the absolute encoder mounted on the output shaft after the transmission. For each self-test, the channel configuration is selected by alternating channel 1/channel 2.

This "Fail-Operational" version thus provides better HAZ availability (0.5 10-7/FH, estimated at 10-8/FH with dual COM/MON Std-By) and the same very high integrity, still in the same stand-alone casing by means of a particular and partial electromechanical and complete redundancy of the motor control electronics.

Figure 4:
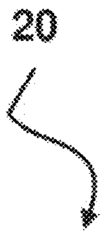
FIG. 4 schematically illustrates an outer casing intended to receive the mechanical flight control actuator of FIG. 2.
Figure 4:
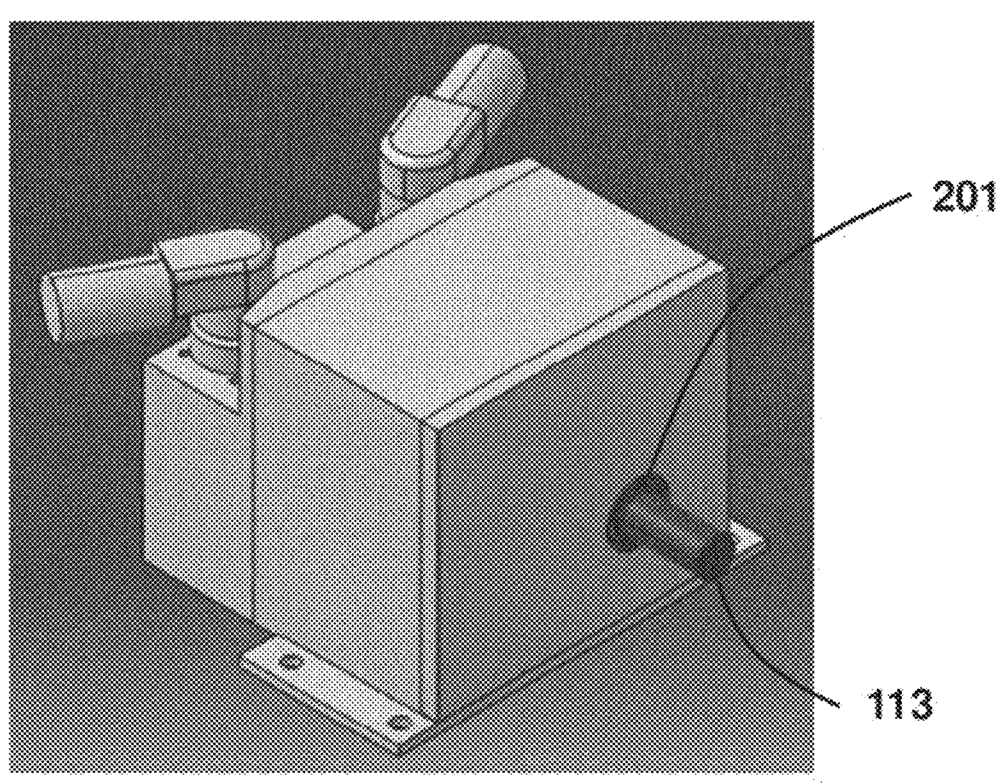

FIG. 4 illustrates an example of such a casing 20. This casing 20 has a generally parallelepiped shape. More specifically, the casing 20 comprises a port 201, through which the output shaft 113 exits. The compactness of the unit 20 is optimized in depth by CAD design.

Figure 3:
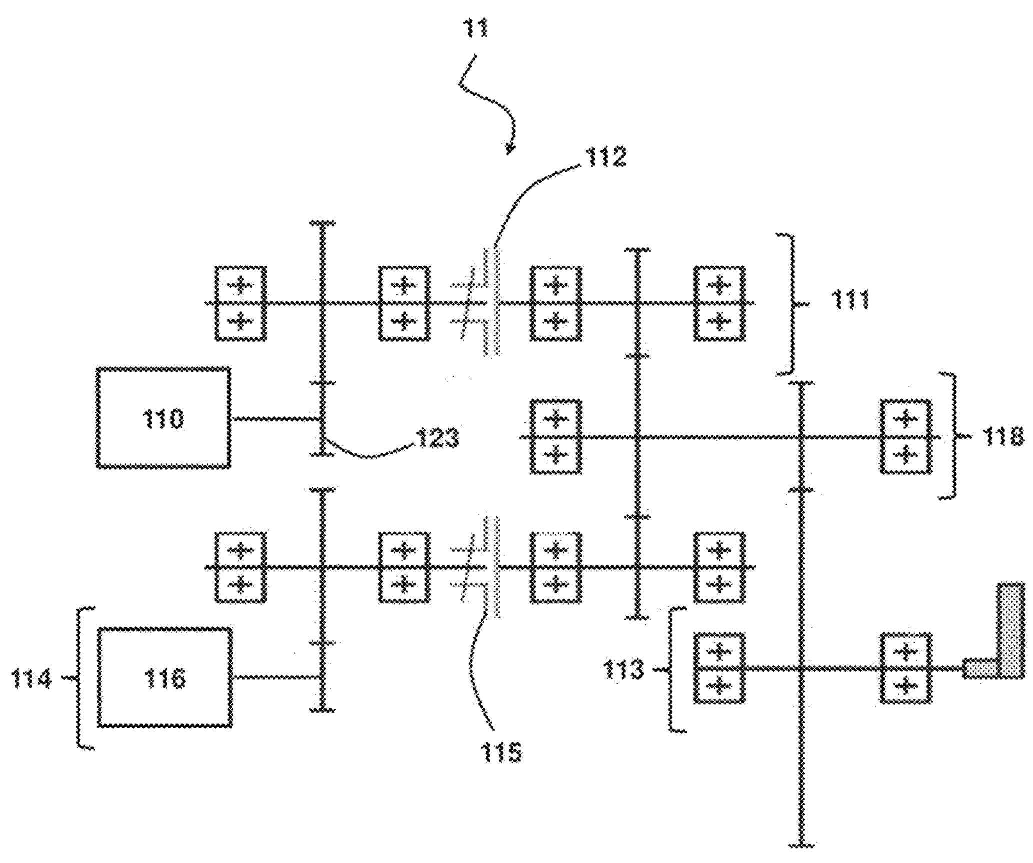
FIG. 3 provides a more detailed illustration in the case of the "Fail-Operational" version of an electromagnetic part of the mechanical flight control actuator of FIG. 2.

FIG. 3, in the case of the "Fail-Operational" version, provides a more detailed illustration of part of the mechanical flight control actuator 11 (parallel rotary actuator) comprising an electromechanical part with a motor, clutches, shafts, bearings, gear trains, a friction device and a damping device.

The control state logic of the input clutch device 112 and of the backup assist clutch device 115 is as follows:

- in an initialization state, the input clutch device 112 is inactive and the backup assist clutch device 115 is active. No current is injected into the coils of the clutch devices;
- in a nominal state, the input clutch device 112 is active and the backup assist clutch device 115 is inactive. A rated current is injected into each coil;
- in an erroneous state following the detection of a failure by the monitoring device 120, this monitoring device 120 commands the input clutch device 112 to be inactive and the backup assist clutch device 115 to be active. No current/voltage is applied to the coils of the clutch devices 112, 115.

For ergonomics and transitioning to an in-flight backup function, switching between the input clutch device 112 and the backup assist clutch device 115 is performed over a short time period and with compatible responsiveness of the two devices.

The switching torque transitions are provided by the input clutch device 112 and the backup assist clutch device 115, which are designed to be compatible with the velocity and acceleration and maximum torque features of the motors 110, 116 (50 W capacity).

The transitions are managed by virtue of a control channel control filter associated with a power bridge for limiting the control latency time for switching and for smoothing the control of power.

The transition filter can be in a version involving simple filtering with a moving average over a 500 ms window, for example.

Another smoothing/prediction version is, for example, a configurable time constant exponential filter, for example, over this 500 ms range for providing a "cross-faded" feeling on switching.

$$\hat{x}_{t+1} = \beta \cdot x_t + (1 - \beta) \cdot \hat{x}_t \text{ with } 0 < \beta < 1$$

With β being a variable that allows a dependency to be adjusted in the immediate or distant past.

A third smoothing/prediction version involves, for example, adding a least squares type polynomial regression to the exponential filtering.

At the same time, a geometric smoothing filter of the control is applied globally. This filter is also associated with an interpolation control on a driver in the high-level control. This provides additional geometric smoothing, by being limited to the requirement, on the one hand, and to the capacity of the actuator, on the other hand, to the programmable limiter speed, the acceleration and the jerk by FIR filters in sequence with adapted time constants. This also optimizes the response of the actuator and, for example, also safeguards against high-frequency resonances or anti-resonances in the transmission under load.

The switching time of the input clutch device 112 and of the backup assist clutch device 115 is favorable for damping when switching with dissymmetrical times via the rotating motor output shaft:

- "current draw" input clutch device 112: typically 18 ms when engaged, 5 ms when disengaged;
- "current shortage" backup assist clutch device 115: typically 10 ms when engaged, 25 ms when disengaged.

The switching time is acceptable with respect to the response of the motor servo loops (20 ms to 200 ms for the angle feedback transfer function).

For the transition, the FCC commands will be buffered and systematically applied in the stand-by electronics so as to limit the latency time upon activation of the stand-by function.

The invention thus provides the following advantages in the "Fail-Safe" version. automatically activated backup friction and only in case of loss of the motor control, thereby optimizing the reversibility and the tactile feedback through motor control, natively secured in case of loss of power;

- a more reliable selective application and with faithful features over the long-term;

"fail-safe" switching even in case of loss of power of the device, with a short time period;

a reduction in mass with a more compact device;

an alternative to the dual-clutch solution based on two clutches validated with a high "service experience" on some types of actuators already sold and available off the shelf by an integrated and miniaturized two-state switching device and with fewer parts;

an opportunity to remove the friction devices mounted in the linkage;

a negligible impact on the main function of the actuator (lack of localized friction in the linkage due to the standby function, which is declutched in nominal operation);

very high integrity and availability;

stable performance capabilities guaranteed over time;

high availability of the passive unit by virtue of a selective application;

automatically activated backup friction and only in case of loss of the motor control, thereby optimizing the reversibility and tactile feedback through motor control, natively secured in case of loss of power;

a more reliable selective application and with faithful features over the long-term;

a particular mechanical switching principle with two reliable supplementary clutches, providing high safety availability, with decoupling of the two motorization channels with respect to a failure on the first motorization/transmission.

The invention thus provides the following advantages in the "Fail-Operational" version:

very high integrity (10-10/FH with a 2×10-11/FH estimate for a dual COM/MOM Std-By) and very high availability (10-7/FH and estimate at 10-8/FH for a dual COM/MON Std-By);

high mechanical robustness and low-play mechanical transmission quality<0.1 deg, for a helicopter environment, by virtue of a quality spur gear design in a compact mechanical module (same advantage as for the "Fail-Safe" version in relation to the number of transmission stages for a 16.5 Nm mac. force law);

partial redundancy of the greater contributors on the availability and based on a particular design of the downstream stages of the non-redundant transmission (close to the output shaft, reliable by means of mechanical dimensioning and margin, mounting feature and "service experience" of over 40 years).

More specifically, the principle involves rendering redundant the upstream electromagnetic elements in the transmission that rotate the fastest (motor and first reducer), as a result of their probability of mechanical failure. The choice of redundancy limits complexity with a smaller number of parts, and with an advantage in terms of mass and price.

Advantageously, the invention allows, in an evolution of the "Fail-Operational" version, coupling of a second transmission/motorization chain to be contemplated in order to increase the availability of the actuator to a high value in an integrated solution in a single actuator unit. The MTBF remains high in the "Fail-Operational" version for harsh environmental conditions for the helicopter, at least of the order of 16,500 H.

The invention advantageously allows, in an evolution of the "Rotary" version, still in the same volume:

integration of an additional irreversibility function on the second channel (activated in case of the invalidity of the commands);

configuration of the SW inhibition of the force law function;

interfacing with a four-computer (FCC) system architecture and a fifth backup computer, such as Smart Trim.

The invention is not limited to the embodiments and variants described, and other embodiments and variants will become clearly apparent to a person skilled in the art.

Thus, in the "Fail-Operational" version, the Stand-By function can be controlled by a third external control channel (as a backup in addition to the computers FCC1/FCC2) and can be secured by a discrete "Force_Commuter" command originating from the external FCC computer, the stick, or the HOTAS in the cockpit.

Thus, the control actuator is compact and can provide, as part of a group of products in the same unit (mechanical interfaces), the "Fail-Safe", "Fail-Operational", "Rotary" product versions based on the same functional blocks, the same SW configuration, and 70% of common parts in series (in the case of the "Rotary" version with the addition of a brake).

The invention claimed is:

1. A mechanical flight control actuator intended to provide assistance to means for piloting an aircraft, said flight actuator comprising:

a first electric motor;

an input shaft adapted to be set into rotation by the first electric motor, said input shaft comprising an input clutch device, said input clutch device having an active position, wherein it is capable of coupling the input shaft with an output shaft via an intermediate shaft, and an inactive position;

the output shaft being capable of being connected to the means for piloting the aircraft, said output shaft being adapted to be coupled with the input shaft when the input clutch device is in the active position;

wherein said actuator comprises:

a second electric motor;

a backup assist shaft, said backup assist shaft being adapted to be set into rotation by the second electric motor, said backup assist shaft comprising a backup assist clutch device, said backup assist clutch device being jointly electrically controlled by the same signal with the input clutch and being capable of assuming an active position, wherein the backup assist shaft drives the output shaft, and an inactive position, and in that the backup assist clutch device is in its active position when the input clutch device is in its inactive position and said backup assist clutch device is in its inactive position when the input clutch device is in its active position.

2. The control actuator as claimed in claim 1, wherein a failure of the first electric motor renders the input clutch device inactive and renders the backup assist clutch device active.

3. The control actuator as claimed in claim 1, wherein the first electric motor is identical to the second electric motor.

4. The control actuator as claimed in claim 1, wherein the input clutch device is of the "current draw" type with logic complementary to the backup assist clutch device of the "current shortage" type.

5. The control actuator as claimed in claim 1, wherein the transition between the input clutch device and the backup assist clutch device is automatic.

6. The control actuator as claimed in claim 1, wherein the transition between the input clutch device and the backup assist clutch device is managed by transition filtering.

7. The control actuator as claimed in claim 1, wherein the transition filtering allows simple moving average filtering over a predetermined time window.

8. The control actuator as claimed in claim 7, wherein the transition filtering is simple exponential smoothing filtering provided by the expression:

$$\hat{x}_{t+1} = \beta \cdot x_t + (1 - \beta) \cdot \hat{x}_t \text{ with } 0 < \beta < 1,$$

with $x_t$ being a value for the time t, $\hat{x}_t$ being a smoothed value for the time t, a smoothed value for the time t+1 and β being a smoothing factor ranging between 0 and 1.

9. The control actuator as claimed in claim 8, wherein a polynomial regression is added to the simple exponential smoothing filtering.

10. An automatic flight control system for an aircraft comprising a mechanical flight control actuator as claimed in claim 1.

* * * * *